United States Patent [19]

Kako et al.

[11] Patent Number: 4,539,857
[45] Date of Patent: Sep. 10, 1985

[54] RACK-AND-PINION TYPE STEERING GEAR

[75] Inventors: Hiroyoshi Kako, Aichi; Nobuo Kobayashi; Iwao Tanimoto, both of Toyota; Shigeo Aiba, Aichi, all of Japan

[73] Assignee: Toyota Jidosha Kabushiki Kaisha, Aichi, Japan

[21] Appl. No.: 531,251

[22] Filed: Sep. 12, 1983

[30] Foreign Application Priority Data

Nov. 30, 1982 [JP] Japan ................ 57-210863

[51] Int. Cl.³ .............. F16H 1/04; B62D 1/20; B62D 5/06
[52] U.S. Cl. ........................... 74/422; 74/498; 180/148
[58] Field of Search ............... 74/422, 498; 180/148

[56] References Cited

U.S. PATENT DOCUMENTS 3,572,158  3/1971  Adams ..................... 74/422
3,623,379  11/1971  Bradshaw et al. ........... 74/498
3,844,181  10/1974  Bayle ..................... 74/422
3,979,968  9/1976  Ceccherini ................ 74/422

FOREIGN PATENT DOCUMENTS 946501  1/1964  United Kingdom ........... 74/498
1340882  12/1973  United Kingdom ........... 74/498

Primary Examiner—Lawrence Staab
Assistant Examiner—Michael D. Bednarek
Attorney, Agent, or Firm—Parkhurst & Oliff

[57] ABSTRACT

Disclosed is an improvement in a rack-and-pinion type steering gear, wherein a rack bar abutting portion is so formed as to project from the inner surface of the insert hole at the circumference of the upper opening of the rack guide hole, and the rack guide is made of a low-rigid material such as synthetic resin. There is defined a clearance between the rack guide abutting portion and the back of the rack bar, which clearance is larger than the clearance between the rack guide and the set bolt, but smaller than the elastic deformation limit of the rack guide.

4 Claims, 5 Drawing Figures

RACK-AND-PINION TYPE STEERING GEAR

BACKGROUND OF THE INVENTION

This invention relates to a rack-and-pinion type steering gear particularly for use with an automotive vehicle.

In a conventional rack-and-pinion type steering gear as shown in FIGS. 1 and 2, a pinion shaft 4 having a pinion 3 at its one end is rotatably supported by bearings to a rack housing 2 fixed to an automotive body and a rack bar 5 having rack teeth 6 meshed with the pinion 3 is inserted into an insert hole 13 formed in the rack housing 2. The other end of the pinion shaft 4 is connected to a steering main shaft (not shown) and both ends of the rack bar are connected through tie rods 20 to knuckle arms (not shown) of an axle shaft. The rack housing 2 is formed with a rack guide hole 14 on the opposite side to the meshed position of the pinion 3 and the rack teeth 6, and a rack guide 7 is inserted into the rack guide hole 14. The rack guide 7 is formed with a semi-circular guide surface 11 at its front end which surface is abutted against the back surface of the rack bar 5. A set bolt 8 is screwed into the rack guide hole 14 from the lower side of the rack guide 7 and serves to restrict a regressive stroke of the rack guide 7. A compression spring 9 is interposed between the set bolt 8 and the rack guide 7 and normally biases the rack guide 7 toward the rack bar 5. There is defined a guide clearance t' between the lowermost end of the rack guide 7 and the uppermost end of the set bolt 8 so as to allow the rack guide 7 to regress along the rack guide hole 14 by a given length. (See FIG. 2.)

In relation with the above-mentioned arrangement, when a large torque of the pinion 3 is transmitted to the rack teeth 6, there is created a repulsive force acting to repulse the rack bar 5 from the pinion 3 corresponding to the pressure angle of the pinion 3. Such a downward movement of the rack bar 5 due to the repulsive force is restrained within its permissible limit by the action that the rack guide 7 fills the guide clearance t' and abuts against the set bolt 8. Accordingly, the rack guide 7 is generally made of a high-strength material such as a metal so as not to be damaged even if a large repulsive force is created during a rough road running of a vehicle and the like. However, in the rough road running, a repulsive force greater than the biasing force of the compression spring 9 is likely to be frequently created and every time of the creation of the repulsive force, the rack guide 7 collides with the set bolt 8, thereby disadvantageously causing a creation of noise.

As measures against the above drawbacks, it is effective to reduce a rigidity of the rack guide 7 and to this end, it is conceivable to make the rack guide 7 of a low-rigid material such as a synthetic resin as well as improve the shape of the same. This is desirable from a viewpoint of lightening the weight of a vehicle and reducing the cost for manufacturing the steering gear. However, the rack guide made of resin is hard to obtain a sufficient strength so as not to be damaged upon receipt of a large repulsive force.

SUMMARY OF THE INVENTION

Accordingly, it is an object of the present invention to provide a rack-and-pinion type steering gear which is lightweight and inexpensive, and may include a rack guide made of a low-rigid material such as a synthetic resin to reduce a vehicle noise.

The inventors investigated the magnitude and the frequency of occurrence of a torque transmitted from the pinion to the rack, that is, a repulsive force generated between the pinion and the rack. As the result of such an investigation, they have found that even if a rack guide made of a low-rigid material is used, a large repulsive force as to cause break-down of the rack guide is rarely generated and that a small and a medium repulsive force as to cause a vehicle noise is frequently generated.

According to the present invention, a rack bar abutting portion is so formed as to project from the inner surface of the insert hole at the circumference of the upper opening of the rack guide hole. The rack guide is made of a low-rigid material such as synthetic resin. There is defined a clearance between the rack guide abutting portion and the back of the rack bar, which clearance is larger than the clearance between the rack guide and the set bolt. With this arrangement, a large repulsive force as to cause break-down of the rack guide made of a low-rigid material is directly received on the rack bar abutting portion, and a small and a medium repulsive force as to cause a vehicle noise is received on the rack guide to suppress occurrence of the noise.

The other objects and advantageous features of the invention will become more clear from the following description of the preferred embodiments taken in conjunction with the accompanying drawings.

DETAILED DESCRIPTION OF THE PREFERRED EMBODIMENT

Figure 1:
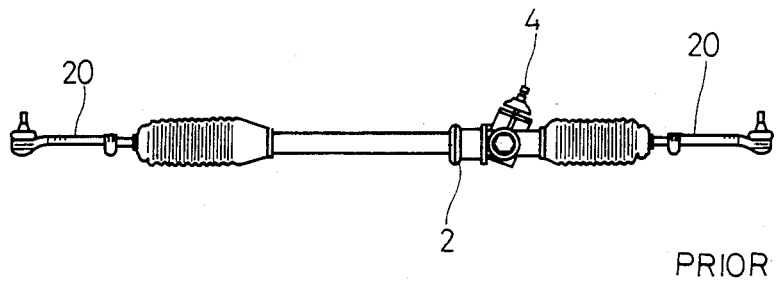
FIG. 1 is an elevational view of a rack housing in connection with a rack-and-pinion type steering gear.
Figure 2:
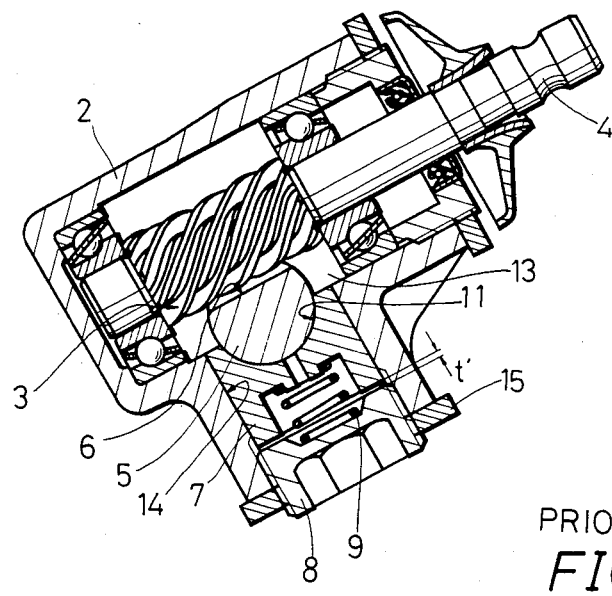
FIG. 2 is a cross sectional view of a rack guide structure in the prior art.
Figure 3:
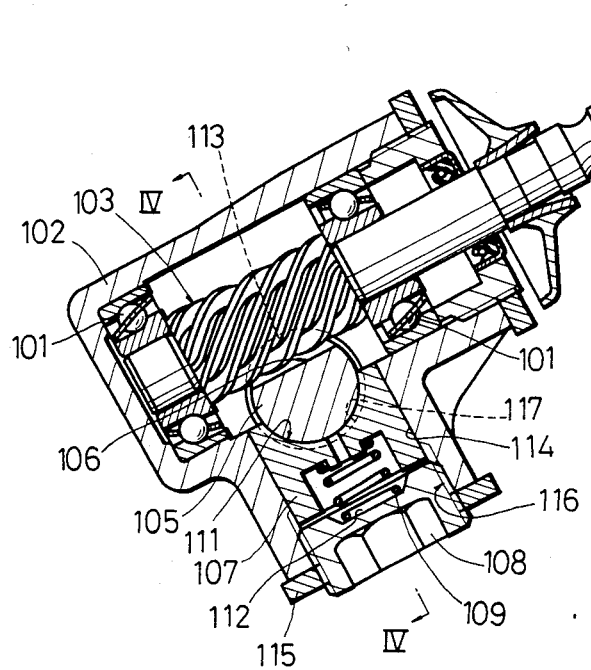
FIG. 3 is a cross sectional view showing a preferred embodiment of the invention and corresponding to FIG. 2.
Figure 4:
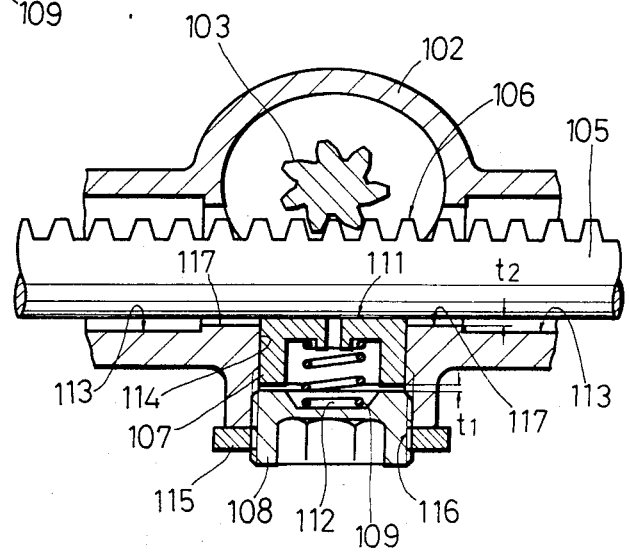
FIG. 4 is a cross sectional view taken along the line IV–IV of FIG. 3.

Referring now to FIGS. 3 and 4, reference numeral 102 designates a rack housing of the rack-and-pinion type steering gear. A pinion shaft 104 having a pinion 103 at its one end is rotatably supported by bearings 101 in the rack housing 102. A rack bar 105 is formed with rack teeth 106 in a given length thereof on its one side along its axis, and is inserted into an insert hole 113 of the rack housing 102 in such a manner that the rack teeth 106 may be meshed with the pinion 103. The pinion shaft 104 is connected to a steering main shaft (not shown) at its other end. Both ends of the rack bar 105 are connected through tie rods to knuckle arms of an axle shaft.

Reference numeral 107 designates a columnar rack guide made of synthetic resin having a semi-circular guide surface 111 at its upper surface facing to the outer circular surface of the rack bar 105. The rack housing 102 is formed with a cylindrical guide hole 114 at the opposed side of the meshed position of the pinion 103 and the rack teeth 106. The guide hole 114 is directed at right angles to the axis of the pinion shaft 104 and to the axis of the rack bar 105, and is formed with a female screw 116 on the inner wall at the lower opening portion thereof. The insert hole 113 of the rack housing 102 is formed with a rack bar abutting portion 117 projecting from the inner surface of the insert hole 113 at the circumference of the upper opening of the guide hole 114. The rack bar abutting portion 117 has a given axial length and a diameter smaller than the inner diameter of the insert hole 113 and slightly larger (about one milimeter) than the outer diameter of the rack bar 105. The inner diameter of the insert hole 113 is designed to be larger than the outer diameter of the rack bar 105 by about four to five milimeters.

The rack guide 107 is inserted into the rack guide hole 114 and the guide surface 111 of the rack guide 107 is normally abutted against the back side surface of the rack bar 105. A set bolt 108 is threadedly engaged with the female screw 116 of the guide hole 114 and is formed with a spring positioning seat 112 for a compression spring 109 at the opposite side of the rack guide 107. The compression spring 109 is interposed between the set bolt 108 and the rack guide 107 and is adapted to normally urge the rack guide 107 toward the rack bar 105. There is defined a guide clearance t1 corresponding to a regressive limit of the rack guide 107 between the rack guide 107 and the set bolt 108 under the normal meshing condition of the rack teeth 106 and the pinion 103. There is further defined another clearance t2 between the back side surface of the rack bar 105 and the rack bar abutting portion 117 of the rack housing 102. (See FIG. 4.)

The rack bar 105 is likely to move in the axial direction of the guide hole 114 by the influence such as dimensional error in manufacturing the pinion 103, degree of concentricity between the pinion shaft 104 and the pinion 103, dimensional error in manufacturing the rack teeth 106 and degree of parallelism between the rack bar 105 and the rack teeth 106. The clearance t1 is specified as a dimension substantially equal to the above-mentioned displacement of the rack bar 105. Therefore, in case that the rack bar 105 is moved beyond the specified clearance t1, the excessively regressive displacement of the rack guide 107 is restricted. The specified clearance t1 is usually about 0.05 milimeters.

The clearance t2 is determined in such a manner that it does not exceed the permissible limit of deformation of the rack guide 107 when a repulsive force from the pinion 103 is applied to the rack bar 105 and the rack bar 105 is moved beyond the displacement t1. The clearance t2 is practically set to about 0.45 milimeters which are an amount of elastic deformation of the rack guide 107 corresponding to a requisite load (about 300 Kg), wherein the amount of elastic deformation of the rack guide 107 is dependent upon the elastic modulus of resin and the shape of the rack guide 107, and the requisite load means a maximum repulsive force within the extent that it is not frequently generated and it is not a serious problem from viewpoint of noise. The clearance t1 is set by adjustment of the extent of threadedly engagement of the set bolt 108. Under this condition, the set bolt 108 is locked to the housing 102 by a lock nut 115.

In operation, the pinion 103 is rotated by the operation of a steering wheel (not shown) and in cooperation with the rotation of the pinion 103, the rack bar 105 is moved in the right and left directions as viewed in FIG. 4. In this operation, the rack bar 105 is moved with the rack guide 107 in the axial direction of the rack guide 107 because of the dimensional error in manufacturing the pinion 103 and the rack bar 105. When the displacement t of the rack guide 107 is in the range of $0 < t < t1$, the displacement t is absorbed by the elasticity of the compression spring 109. In the case that a large torque of the pinion 103 is transmitted to the rack teeth 106 during rough road running or turning of a vehicle, a repulsive force for pushing away the rack bar 105 from the pinion 103 is generated because of the pressure angle of the pinion 103 as aforementioned. When the repulsive force is in a low or medium level (less than about 300 Kg) which force is generated at a high frequency during rough road running of a vehicle, the displacement t of the rack bar 105 is in the range of $t1 < t < t2$. In this case, the displacement t is the sum of the deformation t1 of the compression spring 109 and the elastic deformation $t - t1$ ($< t2$) of the rack guide 107 after abuttment of the rack guide 107 against the set bolt 108.

Since the clearance t2 is set in the range not exceeding the permissible limit of deformation of the rack guide 107 as is aforementioned, there is no possibility of damage of the rack guide 107 by the deformation due to the repulsive force. In addition, the noise due to the collision of the rack guide 107 with the set bolt 108 is suppressed due to the fact that the rack guide 107 is made of resin.

In the case that a large repulsive force (more than about 300 Kg) which is rarely generated is applied to the rack bar 105, the rack bar 105 deforms the compression spring 109 and the rack guide 107 by turns to move by the displacement t2 and directly abut against the rack bar abutting portion 117 of the rack housing 102. An increased repulsive force after abuttment of the rack bar 105 against the rack bar abutting portion 117 is wholly received on the rack bar abutting portion 117 of the rack housing 102, thereby preventing the rack guide 107 from being damaged. Further, as the collision of the rack bar 105 with the rack bar abutting portion 117 is less frequently occurred, the noise due to the collision is insignificant as a matter of a vehicle noise.

Figure 5:
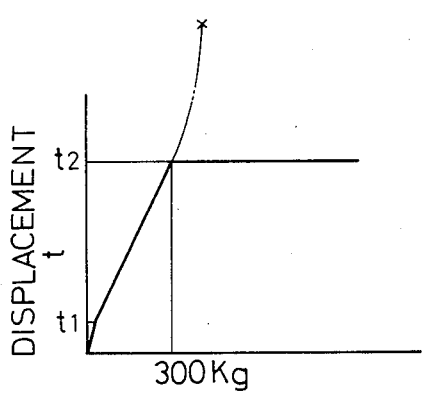
FIG. 5 is a graph showing the relation between a repulsive force and a displacement of the rack bar according to the present invention.

The relation between the repulsive force and the displacement of the rack bar 105 as stated above is shown by the solid line in FIG. 5. In the range of $0 < t \leq t1$, this relation follows a straight line determined by the spring constant of the compression spring 109. In the range of $t1 < t \leq t2$, this relation follows a straight line determined by the spring constant of the compression spring 109 and the elastic modulus of the rack guide 107. Furthermore, in the range of $t2 < t$, this relation follows a straight line determined by the elastic modulus of the rack housing 102. As is apparent from FIG. 5, unless the rack housing 102 is provided with a rack bar abutting portion 117, when the repulsive force exceeds about 300 Kg, the displacement of the rack bar 105 is increased following the chain line as shown in FIG. 5 and finally the rack guide 107 is damaged at the position of mark X. On the contrary, according to the preferred embodiment, even when the repulsive force exceeds about 300 Kg, the displacement of the rack bar 105 is not almost changed, thereby preventing the rack guide 107 from being damaged.

While the invention has been described with reference to one preferred embodiment thereof, it is to be understood that modifications or variations may be easily made without departing from the scope of this invention which is defined by the appended claims.

What is claimed is:

1. A rack-and-pinion type steering gear comprising a rack housing, a pinion inserted into said rack housing and adapted to rotate in cooperation with rotation of a steering wheel, a rack bar having rack teeth normally meshed with said pinion and adapted to move reciprocatingly in an insert hole formed in said rack housing in association with rotation of said pinion, a rack guide hole formed in said rack housing and on the opposite side to the meshed position of said pinion and said rack teeth, a rack guide made of a low-rigid material inserted into said rack guide hole and abutting against a back side surface of said rack bar to guide the reciprocating motion of said rack bar, a set bolt screwed into said rack guide hole from a rear side of said rack guide and adapted to restrict the regressive stroke of said rack guide, a spring interposed between said set bolt and said rack guide and adapted to urge said rack guide at a predetermined force toward the rear side surface of said rack bar, and a rack bar abutting portion projecting from the inner surface of said insert hole at the circumference of said rack guide hole of said rack housing and opposed to the rear side surface of sdid rack bar, a clearance larger than a regressive limit and smaller than an elastic deformation limit of said rack guide being defined between the back side surface of said rack bar and said rack bar abutting portion.

2. The rack-and-pinion type steering gear as defined in claim 1, wherein said rack guide is made of synthetic resin.

3. A rack-and-pinion type steering mechanism comprising:

- a rack housing;
- a pinion rotatably mounted in said rack housing;
- a rack bar movably inserted into said rack housing and having rack teeth normally meshing with said pinion to move said rack bar longitudinally concurrently with rotation of said pinion;
- a rack guide hole formed in said rack housing adjacent to a back surface of said rack bar opposite to said rack teeth;
- a rack guide of a resilient material inserted into said rack guide hole and abutting against said back surface of said rack bar to guide said longitudinal motion of said rack bar;
- a set bolt screwed into said rack guide hole from a side of said rack guide opposite said rack bar;
- a spring between said set bolt and said rack guide for urging said rack guide toward said back surface of said rack bar and normally spacing said rack guide apart from said set bolt by a first clearance; and
- a rack bar abutting portion projecting towards said back surface of said rack bar from an inner surface of said housing adjacent a circumference of said rack guide hole, a second clearance between said rack bar abutting portion and said rack bar being larger than said first clearance, but smaller than an elastic deformation limit of said rack guide.

4. The rack-and-pinion type steering mechanism of claim 3, wherein said rack guide comprises a resilient synthetic resin.

* * * * *